US008620728B2

United States Patent
Hamelink

(10) Patent No.: US 8,620,728 B2
(45) Date of Patent: Dec. 31, 2013

(54) MANUFACTURING PRODUCTIVITY SCOREBOARD

(76) Inventor: Jeff Hamelink, Shakopee, MN (US)

(*) Notice: Subject to any disclaimer, the term of this patent is extended or adjusted under 35 U.S.C. 154(b) by 2144 days.

(21) Appl. No.: 11/174,893

(22) Filed: Jul. 5, 2005

(65) Prior Publication Data

US 2006/0010001 A1 Jan. 12, 2006

Related U.S. Application Data

(60) Provisional application No. 60/586,352, filed on Jul. 8, 2004.

(51) Int. Cl.
*G06Q 10/00* (2012.01)

(52) U.S. Cl.
USPC ........................................ 705/7.39

(58) Field of Classification Search
USPC ............... 705/38, 35, 37, 7.38, 7.39
See application file for complete search history.

(56) References Cited

U.S. PATENT DOCUMENTS

| 3,981,002 | A  | * | 9/1976 | Gardner | 345/2.1 |
|---|---|---|---|---|---|
| 5,862,517 | A  | * | 1/1999 | Honey et al. | 702/85 |
| 5,891,044 | A  | * | 4/1999 | Golosarsky et al. | 600/509 |
| 6,735,574 | B2 | * | 5/2004 | Bull | 705/32 |
| 2004/0078167 | A1 | * | 4/2004 | Tan et al. | 702/181 |
| 2005/0219323 | A1 | * | 10/2005 | Kusakari | 347/55 |

OTHER PUBLICATIONS

Electronic Displays, Inc., "Product Families", May 20, 2004, http://www.electronicdisplays.com, 13 pgs.*
Electronic Displays Inc., Catalog Request—Manufacturers of large LED and digital displays, May 2004, http://www.electronicdisplays.com/product.gallery.asp?categoryNumber=118, p. 1.*
Electronic Displays Inc., "Catalog Request," May 2004, 1-5.*
James R. Evans, "Statistical Process Control for Quality Improvement: A Training Guide to Learning SPC,", Mar. 1991, Prentice Hall, 14-16.*
T. L. Lai, Herbert Robbins, K. F. Yu, "Adaptive Choice of Mean or Median in Estimating the Center of a Symmetric Distribution," Sep. 1983, Proceedings of the National Academy of Sciences of the United States of America, vol. 80, No. 18, 5803-5806.*
Matthew J. Castelli, "Network Sales and Services Handbook," Nov. 2002, Cisco Press, 191-194.*
Mattec Corporation, "THE-MAN-A-ger© Overview" http://www.mattec.com/manager/index.htm, May 17, 2004, 3 pgs.
Electronic Displays, Inc., "Product Families" http://www.electronicdisplays.com/prodcat/default.asp?cstop=2&pcid=3, May 20, 2004, 13 pgs.

* cited by examiner

*Primary Examiner* — Jonathan G Sterrett
(74) *Attorney, Agent, or Firm* — Patterson Thuente Pedersen, P.A.

(57) ABSTRACT

A system for displaying manufacturing productivity information, including a controller connected to a display device, a momentary actuator and a display. The controller records a plurality of cycle times between sequential actuations of the actuator and stores the cycle times in a library. The controller maintains a count of actuations that have occurred since reset of the timer and records time passed since the reset. The controller determines a median value of the cycle times and multiplies the median value of cycle times by the count of actuations to obtain a resulting value and subtracts the resulting value from the total time since the last reset to determine a value for total downtime. The controller activates the display to show the value for total downtime.

23 Claims, 4 Drawing Sheets

MANUFACTURING PRODUCTIVITY SCOREBOARD

CLAIM TO PRIORITY

This application claims priority to U.S. Provisional Application Ser. No. 60/586,352 filed Jul. 8, 2004 entitled "Manufacturing Productivity Scoreboard" which is incorporated herein in its entirety by reference.

FIELD OF THE INVENTION

The invention includes a processor that processes the inputs from the actuator related to a timer to calculated values for parts per period time and downtime. The calculated values are desirably updated about every three seconds. The processor can also be referred to as a controller. The actuator may also be referred to as an event sensor.

BACKGROUND

In today's modern manufacturing environment there has been a shift towards the philosophy of lean manufacturing. In an effort to comply with this philosophy, manufacturing managers are constantly making efforts to reduce waste and to promote better productivity among their workers. One tool that has been utilized in an effort to improve productivity is for the manufacturing facility to prominently display scoreboards within the facility in an effort to encourage teamwork and a spirit of competitive improvement among the workers.

For example, in an effort to increase productivity, a scoreboard may visually display indications of a goal for a planned number of production units based on the amount of time used in the production process, a display of actual units produced and a value showing the difference between the goal number of units of production and the actual units produced, thus demonstrating whether the production team or individual employee is ahead of or behind the goal value per unit time.

In another example, if a manufacturer is making an effort to improve quality control, they might display a scoreboard indicating a number of production units that have passed inspection, a number of production units that have failed inspection, and a calculated ratio showing a percentage or fraction of production units that have failed inspection.

If a manufacturer is interested in improving compliance with safety procedures within the facility, the manufacturer might display a scoreboard that indicates the number of days since the last injury has occurred in the facility, the number of injuries that occurred during the current month, and the number of injuries that occurred during the prior month.

Existing manufacturing scoreboards that aim to improve productivity largely tend to share one common shortcoming. Management personnel must set a goal for production and program the scoreboard with that goal. This can be a lengthy and difficult task. For example, a particular time must be calculated that should be the expected or goal time to produce a single unit of production. While this calculation may not be an overly large burden in a manufacturing facility that produces very large numbers of the same production unit day after day over a long period of time, it can create a significant burden in job shops that produce short runs of production units over a short period of time. Quite often, the length of time required to calculate a production goal may be greater than the length of time required to produce the entire lot in a given job. Currently available productivity scoreboards do not factor in operator skill, speed or other current variables.

Many manufacturing jobs are repetitive and dull and tend to encourage wandering of the worker's mind while working. After working for a period of time, an employee may become bored and decide to distract himself by engaging in conversation with fellow workers, going to the bathroom, getting a snack, creating other nonproductive tasks to remove himself from the production task at hand or merely day dreaming on the job. All of these activities are non-productive and contribute substantially to periods of downtime. Downtime can be described as periods of time when production is not taking place because the production employee is distracted, interrupted, adjusting or making repairs or adjustments to equipment.

Downtime also occurs if there is some failure in quality of the previous steps in the production process. For example, if a production part is improperly prepared in the first step of the production process, this may slow down subsequent steps in the production process because of the need to adjust or manipulate the part an excessive amount to complete the second or subsequent steps. It is not uncommon for downtime to reach an hour or more in an 8-hour shift. It can readily be seen that if more than one-eighth of a working shift is spent in downtime, production is significantly reduced.

Thus, it would be a great benefit if a production scoreboard could be largely self-programming and could display a reference value for the amount of downtime that occurs in a given production period. It would be further beneficial if the self programming feature would take into account variables that may be specific to that workday such as personnel, process and work environment. It would also be valuable to demonstrate to the worker the significant overall effect on productivity of the many distractions and brief work stoppages that may seem trivial to the worker. These features would allow a manager to intervene early on upon observing that there is a significantly greater amount of downtime than the norm, in order to try to make changes that would improve the productivity for the remainder of the shift.

SUMMARY OF THE INVENTION

The present invention solves many of the above discussed problems by providing a self programming manufacturing scoreboard that displays the total quantity of parts or units manufactured in a production period, the average number of parts or units produced per hour (or other unit of time) as a running value, and the total downtime that has occurred during the production period so far. The manufacturing scoreboard may also include a visible bar graph showing relative production for each fifteen-minute period of the workday. Fifteen minutes is an exemplary value and other time intervals may be used. The invention may also include a signal that is active when downtime is accumulating.

The present invention requires no programming and is "self teaching" in that it determines all the values necessary from a simple switch closing input. Further, the scoreboard of the present invention is independent and it need not be networked into a computer system. If desired, the manufacturing scoreboard may have hardwired or wireless communication capability to report to a central computer system but the manufacturing scoreboard can operate entirely independently. Further still, the scoreboard is particularly useful in job shops that produce short production runs of various parts in response to a particular job request. The invention is portable and self-contained and can be easily relocated within a facility.

The invention includes a scoreboard displaying the quantities as discussed above as well as an optional bar graph showing comparative production at fixed short intervals and an actuator connection. The actuator connection may be a simple two-conductor wire that can be connected to a momentary contact switch that is manually or automatically triggered by an operator, a movement of the machine or a movement of a product at either the beginning, the end or during a manufacturing procedure, step or series of steps performed at the operator's workstation. Another single input signal source may be used as well. The actuator may also include a photocell or proximity sensor.

The invention includes a processor that processes the inputs from the actuator related to a timer to calculated values for parts per period time and downtime. The calculated values are desirably updated about every three seconds.

The invention may also include a signal that operates when downtime is accumulating. The signal may be visual, auditory or tactile. For example, the downtime display may blink while downtime is accumulating. The downtime accumulation signal serves to alert management that an operation is experiencing downtime so that, if necessary, management may take corrective action to eliminate the source of the problem. In addition, the downtime signal also educates the operator as to what activities or inactivities contribute to the accumulation of downtime.

Some manufacturing operations do not lend themselves well to monitoring a parts count. For example, the manufacturing of hose may best be measured in units of feet per minute or meters per hour. Bulk material production may be best measured in units of volume or weight per hour. Thus, the invention includes the option of field selectability so that the units of production may be tailored to the most appropriate units for a given product. Units of time may also be altered to hours, minutes, seconds or other time periods as desired.

The manufacturing productivity scoreboard may also save information for a time longer than a production day. For example, the invention may be configured to store the end of day results for the past nine days, thus allowing management personnel to review activities at a given scoreboard for a period of preceding days.

DETAILED DESCRIPTION OF THE INVENTION

Figure 1:
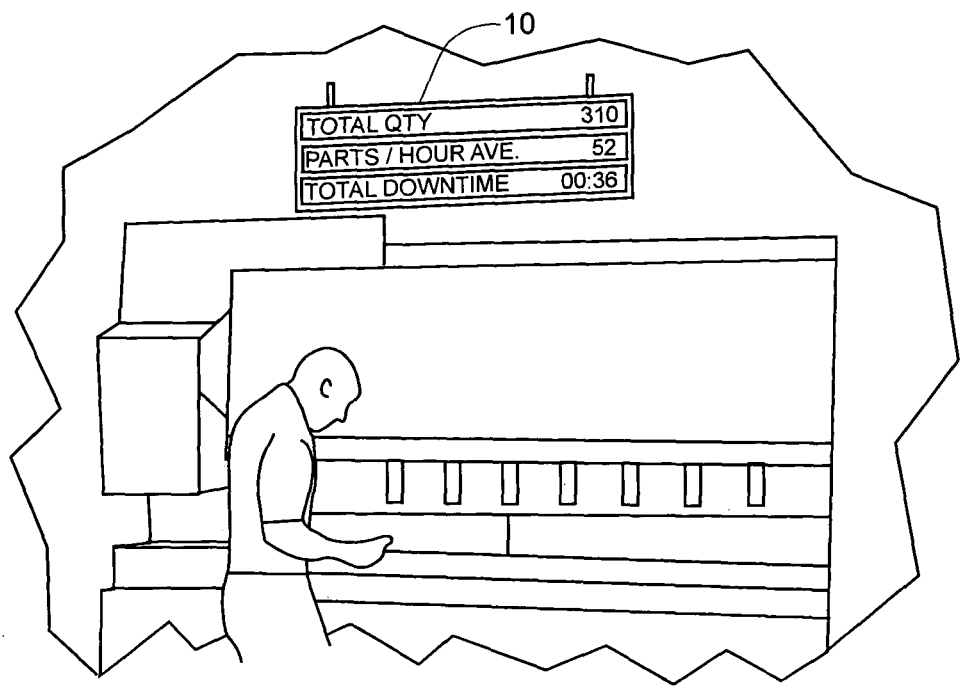
FIG. 1 is a perspective view of an exemplary work station including a manufacturing productivity scoreboard in accordance with the present invention.
Figure 2:
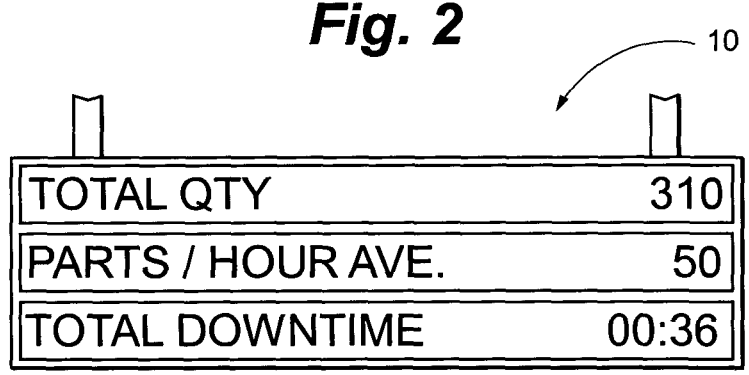
FIG. 2 is a more detailed depiction of the manufacturing productivity scoreboard.
Figure 3:
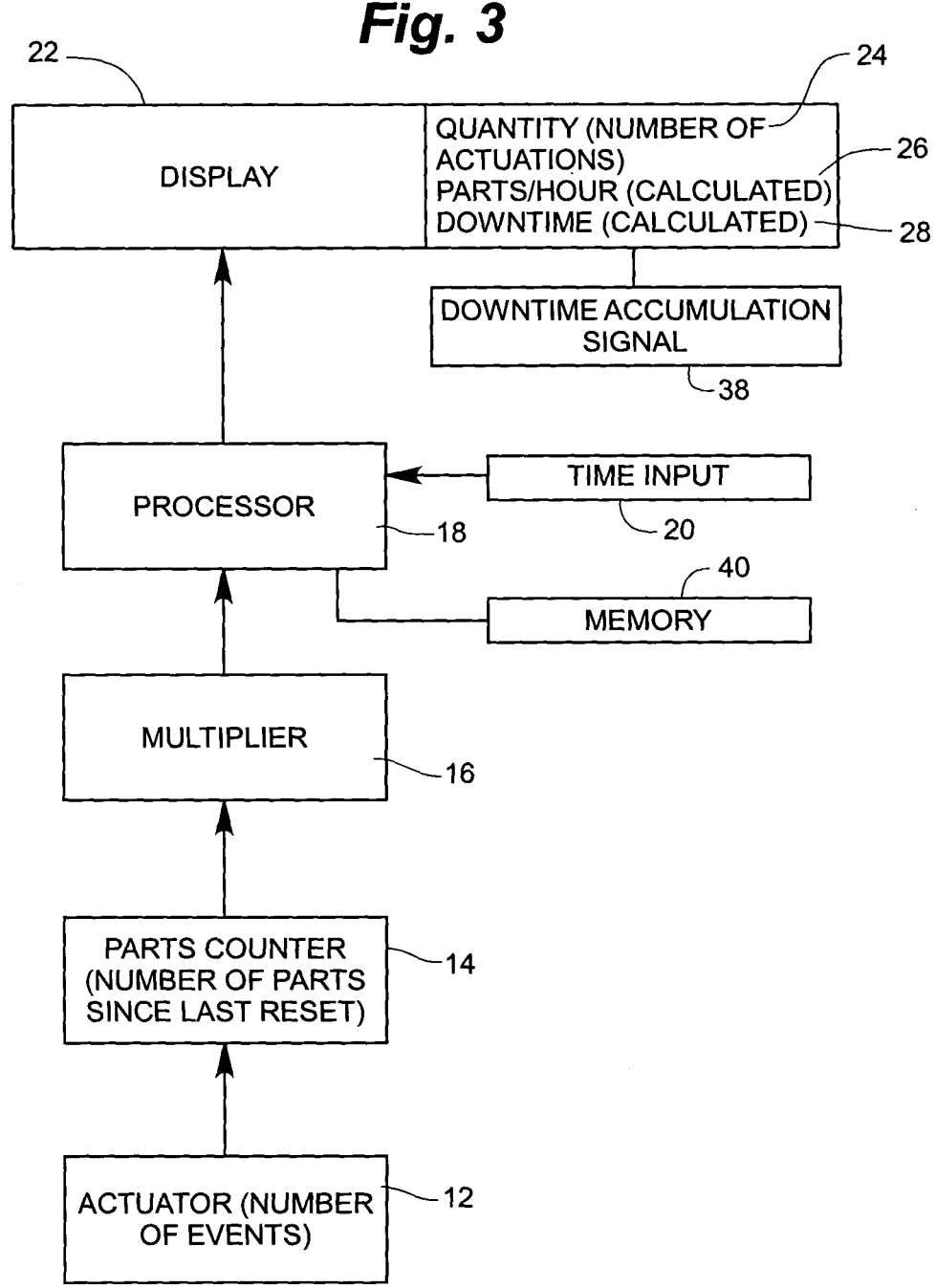
FIG. 3 is an exemplary block diagram of the manufacturing productivity scoreboard process.

Referring to FIGS. 1-3, the manufacturing productivity scoreboard 10 generally includes actuator 12, parts counter 14, multiplier 16, processor 18, time input 20 and display 22. During a manufacturing process, multiple steps are performed. Typically, one or more of these steps is performed at a given workstation while others are performed at other workstations. The present invention monitors activities at a selected workstation. The actuator 12 will typically be a momentary contact switch that is in some form triggered when a part arrives or departs from a given workstation. Between a part's arrival and departure at a given workstation, any number of manufacturing events may occur. The actuator 12 in the present situation is actuated either at the beginning, during or at the end of this series of manufacturing events. The time that passes between a first actuation and a second actuation may be referred to as the cycle time. Cycle times are recorded continuously since the last time that the manufacturing productivity scoreboard 10 has been manually or automatically reset. As used in this application the term parts count should be understood to also include a count of actuations that occur related to the production of a selected unit of bulk material produced. Thus, an actuation may occur, for example, once for each ten feet of hose produced or once for each ton of bulk material produced.

The parts counter 14 maintains a running total of the number of actuations of the actuator 12 that corresponds to a parts count. In the event that multiple steps are undertaken to make a single part or if a single operation produces multiple parts, multiplier 16 performs a mathematical calculation to convert the number of events that are logged into the number of parts produced. Desirably, parts counter 14 can count up to 9999 units. The processor 18 maintains a library of cycle times between each sequential pair of actuations of actuator 12. A running total is maintained for the number of actuations that have occurred since the last reset. The number of parts produced since the last reset is displayed on the scoreboard display 22 labeled as "total quantity." This value enumerates the number of parts produced since the last reset of the scoreboard 10. Preferably, the count can be up to 9999 parts. The display may accumulate down time of up to one hundred hours and is typically reset manually or automatically after a period of inactivity for a predetermined time, for example, four hours.

Display 22 is sized to be readable from a distance of up to three hundred feet and may utilize bright LEDs to prominently indicate displayed figures.

In addition, the processor 18 maintains a library of cycle times for each part produced. To determine downtime, the processor 18 accesses the library of cycle times since the last reset. The processor 18 determines the statistical median value within the library of cycle times. That is, the cycle times in the library are arranged in order of size and the middle value selected. If there are an even number of terms in the library the median is the mean of the two middle numbers. The processor 18 then takes the accumulated time since the last reset and subtracts the product of median value multiplied by the quantity of parts produced to equal the total downtime. This total downtime is then displayed on the scoreboard 10.

The parts counter 14 determines a value for the number of cycles or parts completed per hour or other chosen time period. This value is determined by dividing the total number of parts made since the last reset by the hours since the last reset, to determine a value of parts per hour. This value is then shown on the display labeled as "parts per hour average."

The display 22 thus includes a total quantity value 24, a parts per hour value 26 and accumulated down time value 28.

Thus, total downtime is representative of the total amount of time during which production was not taking place. For example, let us make the following assumptions: a four hour period of time between the beginning of a work shift and a lunch break, a median cycle time of 3 minutes, and the total quantity 24 of parts produced during the four hour shift was sixty. The average number of parts produced per hour 26 is sixty pieces divided by four hours equals fifteen parts per hour. The downtime 28 would be calculated as the four hour period less the product of the number of pieces produced (sixty) times the median cycle time (three minutes) to equal one hour. Thus, this example shows that a worker could have produced 20 parts per hour or 80 total parts in a four hour period if the worker were able to produce consistently at the median cycle time. The total down time 28 will read 1:00 hours which represents the nonproductive time.

Thus, the ability to monitor total downtime provides a tool to help increase productivity per unit time. If productivity per unit time is increased, the total quantity of parts per shift or other chosen unit of time is increased thus increasing total revenues.

Many factors may impact total downtime 28. For example, parts coming to a workstation may be defective or deficient in some way, thus causing the worker at that workstation to spend additional time to correct the deficiencies. Distractions or interruptions to the worker also increase downtime. Interruptions and distractions can include the need to adjust or repair production equipment, or merely that the worker is socializing with other workers, having a snack, taking a break or daydreaming rather than participating in the production process. Thus, effective utilization of the downtime 28 values as a management tool requires the manager to determine the cause of excessive downtime and to take appropriate steps to resolve that cause, if possible.

The invention, as depicted in FIGS. 1-5, may include a productivity log that provides a snapshot history of production rate in fifteen-minute increments. The productivity log can be utilized by management to analyze voids in production such as setup time, breaks, maintenance and distractions to the operator. The productivity log helps management personnel identify the source of downtime by identifying the time at which downtime has occurred at abnormal levels so that a manager may investigate what happened during that time.

Figure 4:
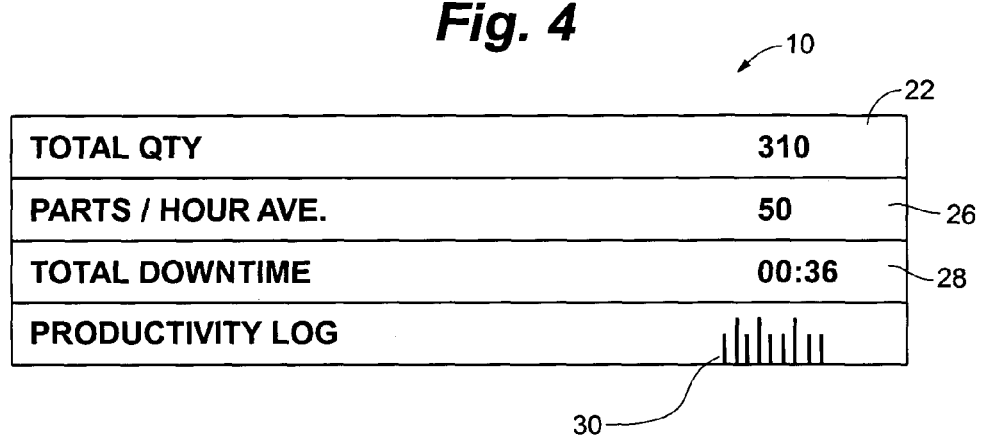
FIG. 4 is a schematic depiction of another embodiment of the invention including a productivity bar graph.
Figure 5:
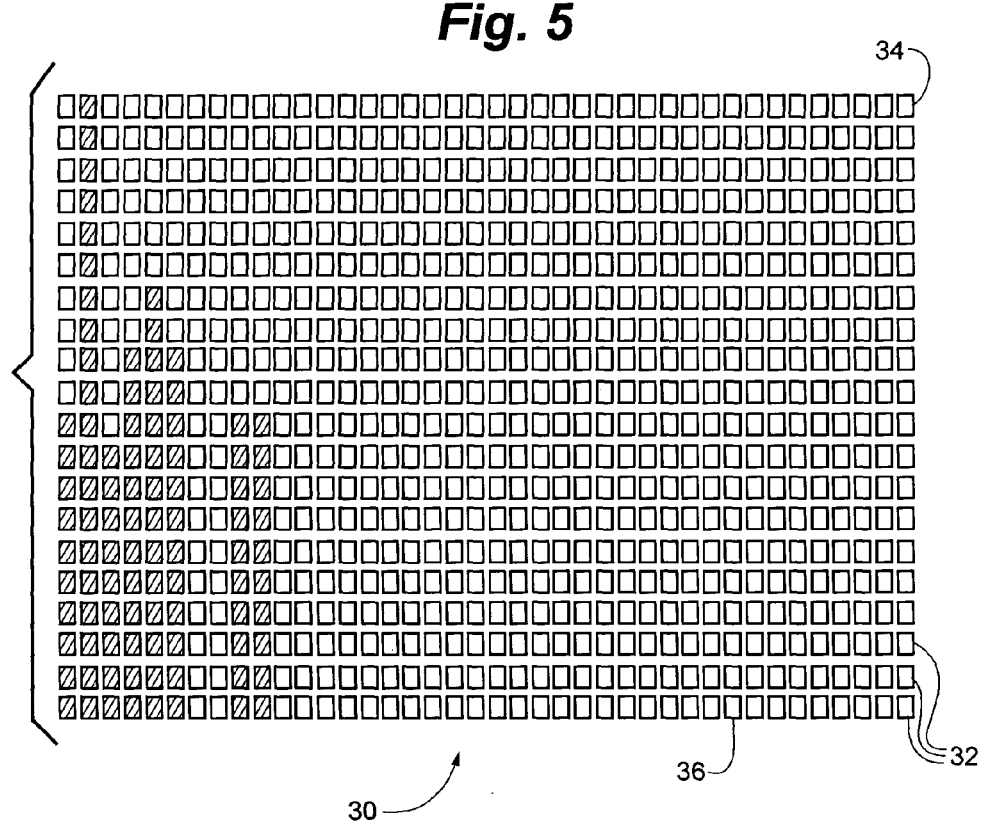
FIG. 5 is a detailed schematic depiction of an exemplary productivity bar graph.

Referring to FIGS. 4 and 5, another embodiment of the invention includes bar graph 30 displaying the contents of the productivity log. Bar graph 30 may include a matrix of light emitting diodes 32. Bar graph 30 may include twenty rows 34 and forty columns 36 of LEDs 32. This display allows the depiction of forty fifteen-minute intervals covering a ten-hour workday and compares the most productive quarter hour period to other fifteen-minute intervals throughout the day. The period of maximum productivity displays twenty lit LEDs 32 in a column representing one hundred percent while other periods will show lesser numbers of lit LEDs 32 rounded to the nearest five percent. So, if in the period of maximum productivity an operator produces fifty parts and in another period the operator produces twenty-five parts the column representing the twenty-five-part period displays ten of twenty lights representing fifty percent. The bar graph 30 representations are recalculated every fifteen minutes or other selected period so that the reference period of maximum productivity may change location on the graph throughout the day.

A manager, looking at bar graph 30, can then account for expected down time that occurs in lunch or break periods and periods of machinery maintenance and setup. The manager can question the employee about unexpected periods of downtime that occur from other causes in order to seek to improve worker productivity. The manager can then work with the employee to try to reduce or eliminate the causes of unexpected downtime that may be caused by employee actions.

The invention may also include downtime accumulation signal 38 that operates when downtime is accumulating. Downtime accumulation signal 38 may be visual, auditory or tactile. For example, downtime accumulation signal 3 may cause downtime 28 to blink while downtime is accumulating. Downtime accumulation signal 38 may also include an auditory tone or vibrator at the production site as well as a signal at a remote location such as a manager's office. The downtime accumulation signal serves to alert management that an operation is experiencing downtime so that, if necessary, management may take corrective action to eliminate the source of the problem. In addition, the downtime signal also educates the operator as to what activities or inactivities contribute to the accumulation of downtime.

Some manufacturing operations do not lend themselves well to monitoring a parts count. For example, the manufacturing of hose may best be measured in units of feet per minute or meters per hour. Bulk material production may be best measured in units of volume or weight per hour. Thus, the invention includes the option of field selectability so that the units of production may be tailored to the most appropriate units for a given product. Units of time may also be altered to hours, minutes or seconds as desired. Parts per hour value 26 may be replaced by a value for feet per minute, pounds per hour, cubic meters per hour or any other unit appropriate for a given manufacturing process. In this case, actuator 12 is triggered periodically by the production of a chosen unit of product. For example, in the manufacturing of hose actuator 12 may be triggered one time by the passage of each ten feet of hose and feet per minute display is updated in units of ten for each actuation of actuator 12.

The manufacturing productivity scoreboard may also save information for a time longer than a production day in memory 40. For example, the invention may be configured to store end of day results for the preceding nine days, thus allowing management personnel to review activities at a given scoreboard for a period of preceding days.

The present invention may be embodied in other specific forms without departing from the central attributes thereof, therefore, the illustrated embodiments should be considered in all respects as illustrative and not restrictive, reference being made to the appended claims rather than the foregoing description to indicate the scope of the invention.

What is claimed is:

1. A system for displaying indicia representing manufacturing productivity information, comprising:
    a computer controller operably connected to a display device;
    a timer operably connected to the controller;
    an event sensor to sense events for a plurality of events, including a first event, operably connected to the controller;
    the controller being operable to record time intervals that pass between paired sequential events and to store a plurality of the time intervals, to calculate a median time interval between the paired sequential events sensed by the event sensor, to keep a count of paired sequential events and intervals and to multiply the median time interval by the count of intervals to obtain a resulting value and to subtract the resulting value from total time since the first event to determine a value for total downtime; and
    the controller being further operable to activate the display to show the value for total downtime following each event.

2. The system as claimed in claim 1, in which the controller is further operable to activate the display to show the count of events since the reset.

3. The system as claimed in claim 2, in which the displayed count of events is labeled "Total Quantity."

4. The system as claimed in claim 1, in which the controller is further operable to divide the count of events since the first event by time passed since the first event to obtain an average value of events per unit time.

5. The system as claimed in claim 4, in which the controller is further operable to activate the display to show the average value of events per unit time.

6. The system as claimed in claim 1, in which the display comprises a scoreboard sized to be clearly visible in a manufacturing environment.

7. The system as claimed in claim 1, in which the controller is further operable to maintain a productivity log.

8. The system as claimed in claim 7, in which the productivity log is maintained by recording the count of events per unit time for sequential equal periods of time.

9. The system as claimed in claim 7, in which the controller is further operable to activate the display to show a graphical representation of the productivity log.

10. The system as claimed in claim 9, in which the graphical representation comprises a bar graph that shows a maximally productive period of time as having a bar extent that covers an entire graph scale and lesser productive periods of time are displayed as relative proportions of the graph scale.

11. The system as claimed in claim 1, further comprising a downtime accumulation signal that is actuated by the controller during a time that downtime is being accumulated.

12. The system as claimed in claim 1, further comprising a memory and in which periodic results are stored for each of selected periods of time and in which the memory is accessible to review the periodic results for multiple selected periods of time.

13. A method of monitoring productivity in a manufacturing environment, the method comprising:
counting manufacturing events, including a first event, with an event sensor operably coupled to a manufacturing device and operably coupled to a controller, the event sensor sensing each event for a plurality of events, the controller being programmed with an algorithm to perform the following;
recording time intervals that pass between paired sequential events and storing a plurality of the time intervals;
calculating a median time interval between events;
multiplying the median time interval by the count of intervals to obtain a resulting value;
subtracting the resulting value from the total time since the first event to determine a value for total downtime; and
activating the display to show the value for total downtime following each event.

14. The method as claimed in claim 13, further comprising activating the display to show the count of events.

15. The method as claimed in claim 14, further comprising labeling the displayed count of events "Total Quantity."

16. The method as claimed in claim 13, further comprising dividing the count of actuations since the reset by time passed since the reset to obtain an average value of actuations per unit time.

17. The method as claimed in claim 16, further comprising activating the display to show the average value of actuations per unit time.

18. The method as claimed in claim 13, further comprising maintaining a productivity log.

19. The method as claimed in claim 18, in which maintaining the productivity log further comprises recording the count of events per unit time for sequential periods of time.

20. The method as claimed in claim 18, further comprising activating the display to show a graphical representation of the productivity log.

21. The method as claimed in claim 20, in which the graphical display comprises a bar graph that shows a maximally productive unit of time as having a bar extent that covers an entire graph scale and lesser productive units of time are displayed as relative proportions of the graph scale.

22. The method as claimed in claim 13, further comprising actuating a downtime accumulation signal during time that downtime is being accumulated.

23. The method as claimed in claim 13, further comprising storing periodic results in a memory for each of a selected period of time and permitting access to review the periodic results for multiple selected periods of time.

* * * * *